Aug. 15, 1939. J. T. RATCLIFFE 2,169,661
TIPPING LOAD CARRYING PLATFORM
Filed Sept. 6, 1938 4 Sheets-Sheet 2

Inventor
John Telford Ratcliffe
By
Attorneys.

Aug. 15, 1939.   J. T. RATCLIFFE   2,169,661
TIPPING LOAD CARRYING PLATFORM
Filed Sept. 6, 1938   4 Sheets-Sheet 4

Inventor
John Telford Ratcliffe
By: Stevens and Davis
Attorneys

Patented Aug. 15, 1939

2,169,661

UNITED STATES PATENT OFFICE 2,169,661

TIPPING LOAD-CARRYING PLATFORM

John Telford Ratcliffe, Frinton-on-Sea, England

Application September 6, 1938, Serial No. 228,669
In Great Britain May 13, 1937

8 Claims. (Cl. 214—85)

This invention is concerned with a new manner and means for loading heavy and unwieldy articles, such for example as smashed motor vehicles, heavy machinery, etcetera, onto a load-carrying platform.

The invention has for an object to render more easy the loading of such heavy articles as immediately-above indicated without the use of expensive or complicated lifting and loading apparatus.

A further object of the invention is to enable a vehicle to be loaded onto a load-carrying platform in such a way that the vehicle itself will not be subjected to any undue strain.

Although perhaps the invention is primarily of utility in its application to a break-down truck for bringing in smashed and broken-down motor vehicles, it may also be applied usefully in conjunction with a device to take the place of a hydraulic lift or ramp for raising cars for servicing and repairs in garages and service stations; particularly would such an arrangement be useful in districts where electric or hydraulic power is not available.

A load-carrying platform of the kind which is mounted for tipping about a substantially horizontal transverse axis and for movement backwards and forwards at right-angles to the axis of tipping, whereby tipping is effected automatically as the platform in its travel moves beyond a point of balance, is, according to the present invention, characterised by the fact that the platform can be moved backwards beyond the point of balance until it lies substantially fully extended beyond the tipping axis so as to assume the least possible inclination to the horizontal permissible according to the relation of the length of the platform to the height of the tipping axis. Provided the platform is long in relation to the height of the tipping axis, it will be appreciated that when the platform is tipped and fully extended it provides a gradual sloping ramp up which a vehicle, heavy machinery, or the like, may easily be drawn by means of a light winch. Rollers may be provided on the rear end of the load-carrying platform in order that it may run over the ground quite easily when traversed backwards in the tipped condition.

The invention further consists in a method of loading vehicles, heavy machinery and the like onto a load-carrying platform, which consists in tilting the platform by traversing it in a direction at right-angles to the axis of tilting until its lower end reaches the level of the freight to be loaded; continuing the traversing movement until the platform is fully extended in relation to the member carrying it; drawing the freight up the ramp provided by the tilted and extended platform, and then drawing the platform into substantially its original position merely by pulling longitudinally.

In order that it may be clearly understood and more readily carried into effect, the invention is hereinafter described with reference to the accompanying diagrammatic drawings, which illustrate the application of the invention to a break-down truck intended to carry another vehicle, such as a smashed motor car.

Figure 6 is an end view partly in section corresponding to Figure 5; while

Figure 1:
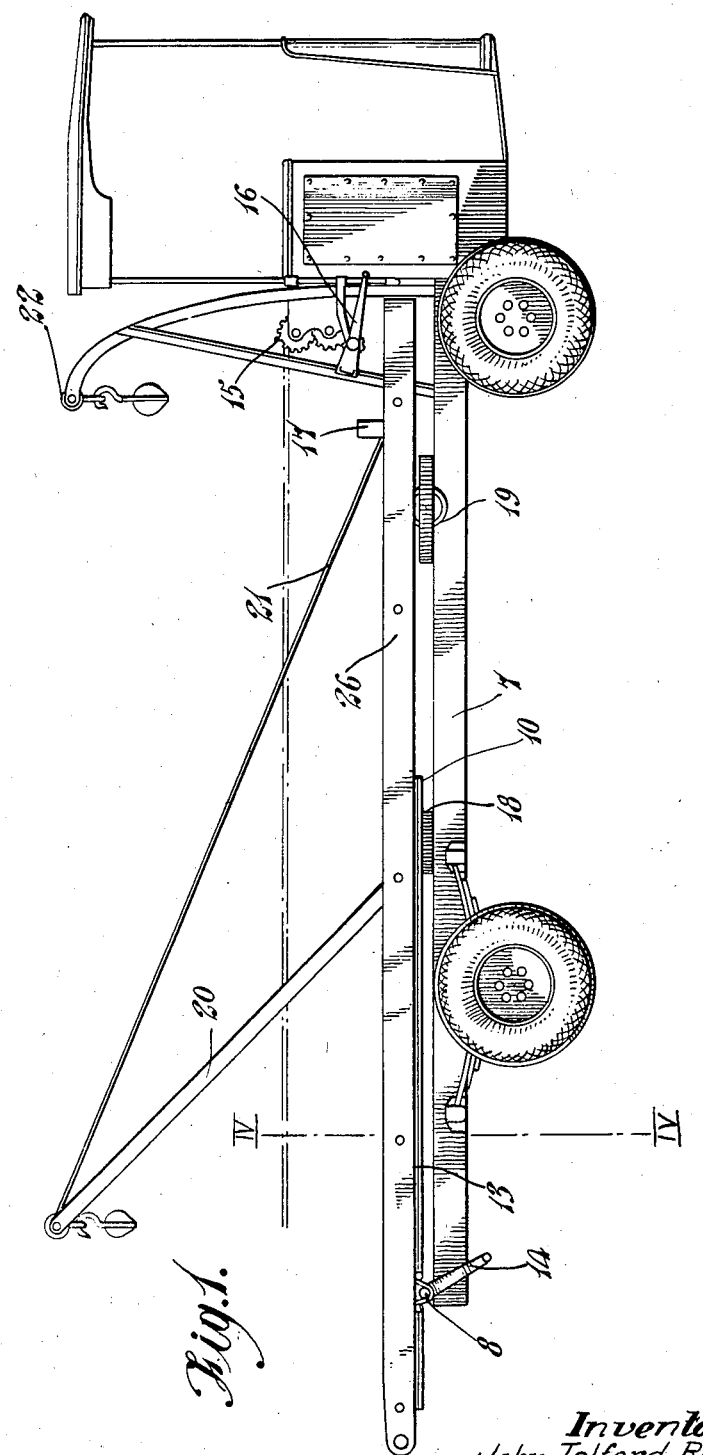
Figure 1 is a side elevation of a low loading breakdown truck according to the invention, the freight-carrying platform being shown in its travelling position.

In carrying the invention into effect as described with reference to Figures 1 to 4, 7 represents the chassis frame of the freight-carrying vehicle. Mounted on the chassis frame through the transverse tipping axis 8 is a load-carrying platform guide composed of two tipping longitudinals, indicated generally by the reference numerals 9 and 10. The guides are composed of two spaced channel members, as indicated more clearly in Figure 4 and in dotted lines in Figure 3. As will be seen from Figure 4, the channels are spaced by the freely rotatable rollers 11, which are provided at intervals along the guides. The guide frame as a whole has no other rigid connection with the chassis than its connection with the transverse tipping axis 8. In the present form of the invention, it will suffice if the load-carrying platform is composed of two substantial ramps at each side of the body, and although in the drawings it is so shown it will be appreciated that a floor extending right across the vehicle may be used. In any event, where two ramps are provided, as shown, they will be rigidly interconnected to move as one. The rollers 11 on the platform guides are engaged by the downwardly-extending projection of the centre flitch plate 12 of each ramp, the ramps as a whole providing the load-carrying platform which is slidable with respect to the platform guides. Movement of the load-carrying platform with respect to the frame is effected by means of the chain 13, which at its ends is secured to the load-carrying platform. The chain is engaged by a sprocket on the tipping axis 8, which sprocket can be turned by the handle 14 to effect longitudinal movement of the chain, and consequently of the load-carrying platform. When the load-carrying platform is moved back by turning the handle 14, it reaches a point of balance beyond which very slight movement will cause the platform to be initially tipped until the rear end of it contacts with the ground leaving the front of the platform extending upwardly and forwardly of the tipping axis; if rotation of the handle 14 is continued, the platform 26 is moved further backwards until it lies substantially fully extended beyond the tipping axis, as shown in broken lines in Figure 2.

Figure 2:
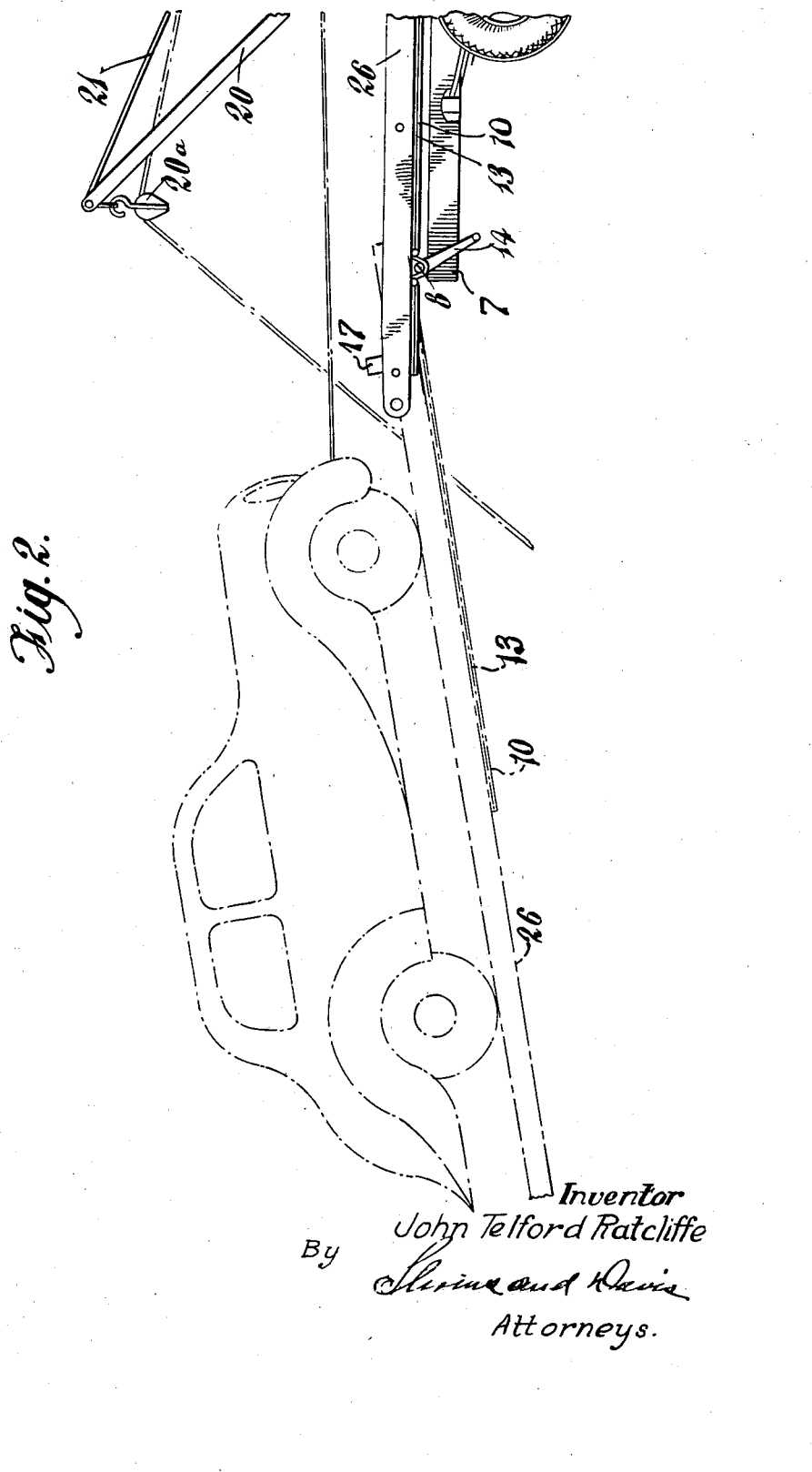
Figure 2 is a side elevation showing the rear part of the vehicle illustrated in Figure 1 but in this figure the load-carrying platform is shown in broken lines in a fully-extended condition with a vehicle in the process of being loaded onto it.

To load a smashed chassis onto the breakdown truck, the vehicle is backed and the platform manipulated into the tipped position indicated in broken lines, as near as possible to the broken-down vehicle, whereafter a rope on the winch drum 15 is hooked onto the chassis, as shown in Figure 2, and on turning the winch handle 16 the chassis is drawn up onto the ramp. Provided on each ramp is a stop member 17, Figure 1, which preferably is adjustable, and when the vehicle engages it, instead of the vehicle alone being drawn up the load-carrying platform, not only the vehicle but also the load-carrying platform is pulled forward by the winch until the balance point is reached. Immediately the balance point is reached, slight further forward movement levels the load-carrying platform and it can then be drawn along to a position as far forward as possible in view of the load on it. In order to support the load-carrying platform in its level position, one or more cross battens, such as 18, may engage the tipping platform guide structure, while towards its forward end the ramp may be supported upon the freely-rotatable rollers 19.

The jib, indicated at 20 in Figure 1, is merely an additional device normally lying between the ramps. Provided the width of the roadway is sufficient to allow the break-down truck to be manipulated into a suitable position, a damaged vehicle can be lifted from a ditch or pit and drawn direct onto the ramps, but if it is required to drag a vehicle out of a ditch before it can be loaded, the jib 20 may be lifted up and supported by the guy ropes 21 in the manner shown in Figure 1, and the rope from the winch drum may be passed over the pulley 20a at or near the nose of the jib so that a lifting pull can be exerted to bring the vehicle sufficiently out of a ditch for it to be drawn up on the load-carrying platform as hereinbefore described. Similarly, in some cases with certain loads, it may be desirable to lead the rope from the winch drum over the pulley 22 at the head of the winch-supporting frame. In accordance with the usual practice in moving heavy loads, pulley blocks may be employed for getting increased mechanical advantage, but in the ordinary circumstances of loading a vehicle up the ramps, it will suffice, owing to the slight inclination of the load-carrying platform in the extended condition, for a single line to extend from the winch to the vehicle on the load-carrying platform.

Figure 3:
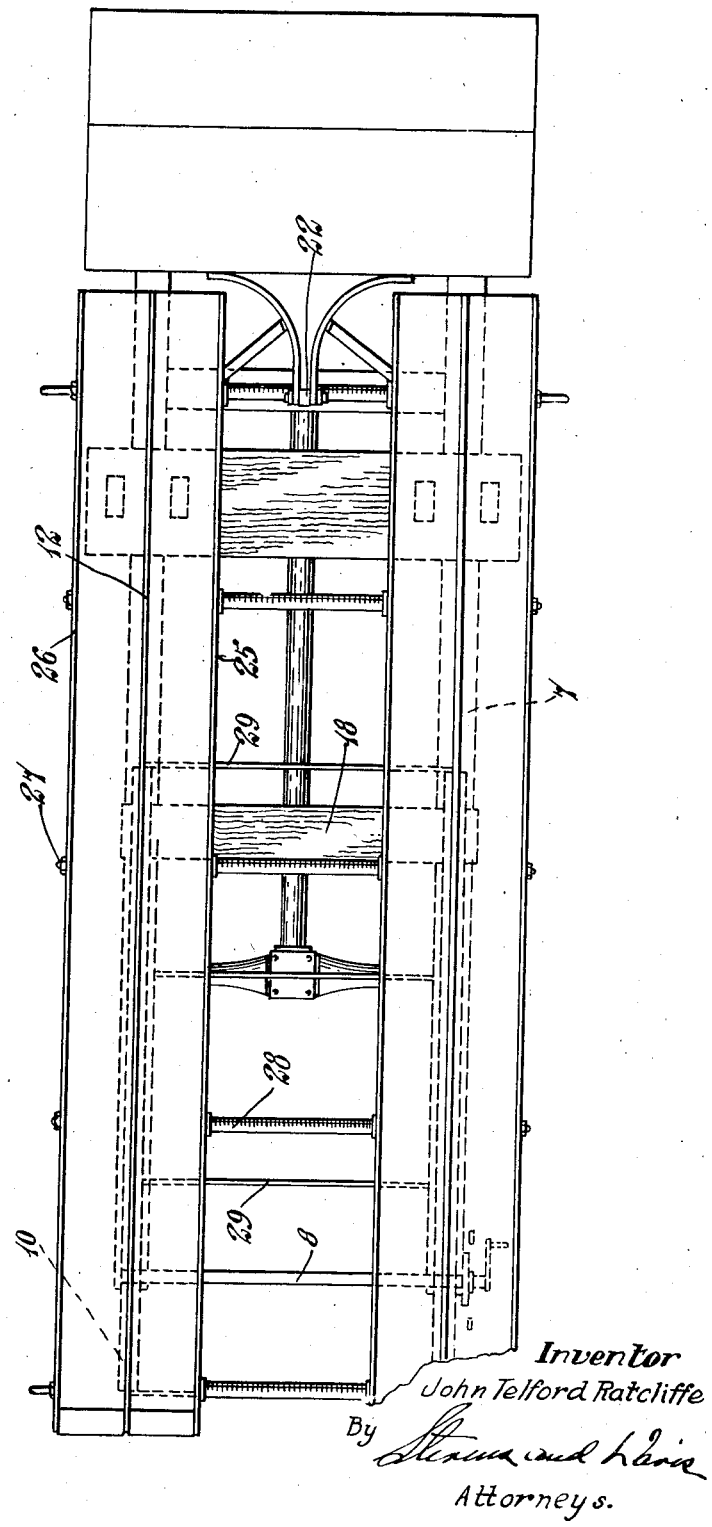
Figure 3 is a plan view corresponding to Figure 1.
Figure 4:
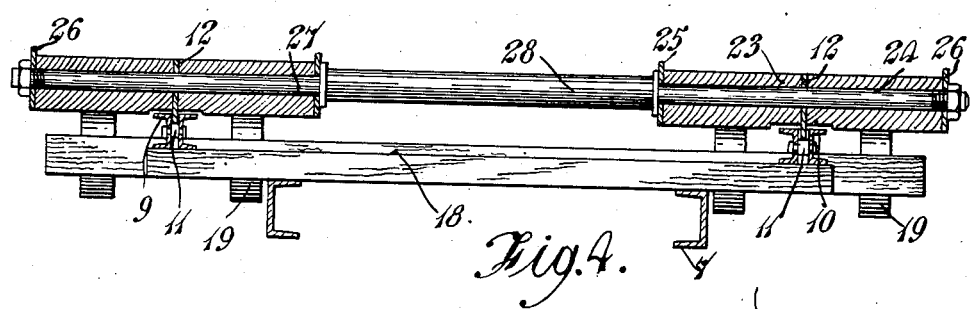
Figure 4 is a section on the line IV—IV of Figure 1.

The loading platform, illustrated in Figure 4, is, as above described, composed of the ramps at each side of the body. Each ramp is built up from substantial wooden battens 23 and 24 spaced by the centre flitch or tie plate 12 and being bordered by the inner and outer flitch plates 25 and 26, respectively. The boundary flitch plates 25 and 26 project up beyond the surface of the battens 23 and 24 in order to prevent anything resting on the battens from being displaced laterally so much as to come off the load-carrying platform. The ramps are connected together to provide in effect the equivalent of a rigid platform by the very substantial stay 27 which passes right through the structure from one side to the other, so that not only are the ramps spaced by the intermediate spacer 28, but also the battens and flitch plates are jammed together when the bolts on the stay are tightened up. Spacers and stays 27 will of course be provided at various points along the loading platform, as indicated in Figure 3, while, similarly, the platform guides at each side will also be interconnected by cross bracers, such as 29, Figure 3, in order that they also may be coupled to move as one.

Generally, it will not be necessary to provide any means for holding the loading platform down upon the guide rollers 11, for its own weight will suffice to do that, but if desired holding-down clips extending from the movable load-carrying platform may be provided to engage under the guides 9 and 10. The small overhang of the guide frame behind the pivotal axis 8 is enough to ensure that rearward movement of the load-carrying platform will transmit corresponding tipping movement to the platform guide structure.

Figure 5:
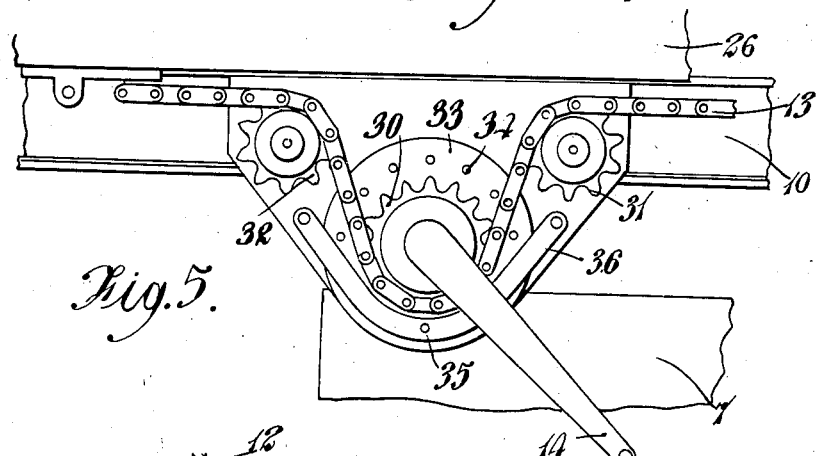
Figure 5 is a detail view of a chain drive for effecting longitudinal movement of the load-carrying platform.

As shown in Figure 5, the chain 13 for causing longitudinal movement of the load-carrying platform with respect to the platform guide structure to effect tipping of the vehicle is caused by turning the handle 14 of the sprocket 30. As the sprocket 30 is turned the necessary longitudinal movement of the chain 13 in the desired direction is performed. The jockey sprockets 31 and 32 merely serve to guide the chain 13 over the sprocket 30. The jockey sprockets 31 and 32 may be adjustable towards or away from one another in order to take up any slack in the chain 13. Similarly, the connection of the chain to the load-carrying platform may be effected through a turnbuckle or equivalent adjusting means. Fast on the shaft of the sprocket 30 is a substantial disc 33 with a number of perforations 34 any one of which may be brought into register with the aperture 35 in the stirrup 36, which is a fixture, so that the sprocket and the handle may be locked by inserting a pin through the fixed aperture 35 and any one of the perforations 34 which is in register therewith. It may be mentioned that when the load-carrying platform is pulled forward by means of the winch, the chain also moves forward merely rotating the sprocket 30 and the handle 14.

Figure 6:
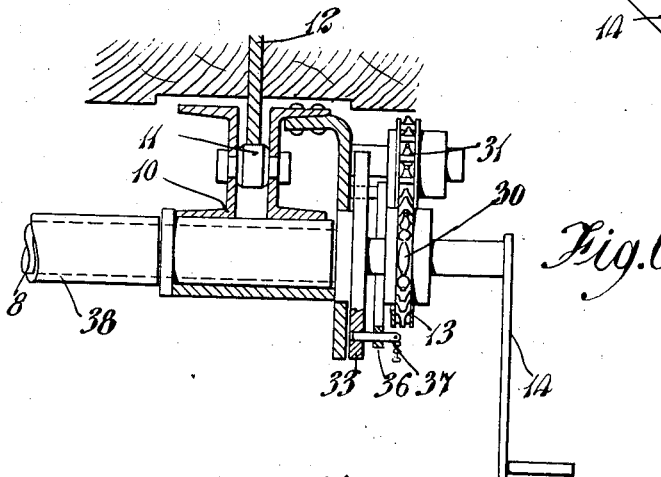

Apart from the fact that it shows an end elevation of the chain drive illustrated in Figure 5, with the pin 37 engaged for locking the sprocket. Figure 6 also shows how the load platform guide structure is mounted upon the tipping axis 8. Bearing boxes on the tipping axis are spaced by the sleeve 38 and are directly attached to the bottom flanges of the platform guides 9 and 10. There is no mechanism necessary for effecting tipping of the load-carrying platform with the guide structure therefor, because the necessary tipping is performed automatically as the load-carrying platform is traversed by the chain 13 on turning the handle 14.

It will be appreciated that any convenient means may be provided for traversing the load-carrying platform; thus, instead of the chain and sprocket mechanism immediately-above described, a rack and pinion mechanism could be provided, the rack being mounted on the underside of the load-carrying platform. It is intended that the means for positively traversing the load-carrying platform shall be used primarily for effecting rearward travel of an unloaded platform, but there is no reason why they should not also be used for rearward travel of a loaded platform. When a load is on the platform, the rope from the winch may either be disconnected for permitting rearward travel of the platform, or the winch may incorporate a free wheel device in order to save the necessity of unwinding the winch drum as the platform goes back when unloading. There may also be provided in conjunction with the winch a travelling guide member for causing the rope to follow the locating grooves for it in the roller. Similarly, the drum of the winch may include a friction brake or other suitable means to prevent it overrunning when the rope is pulled out.

Figure 7:
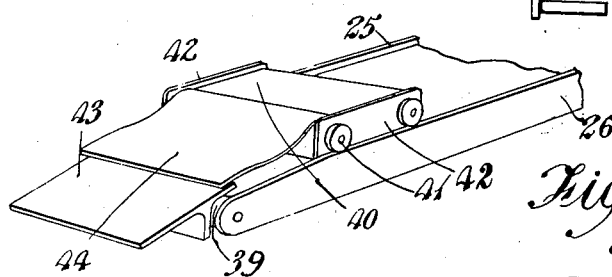
Figure 7 is a detail view of a loading ramp which may be used to prevent a broken chassis damaging the load-carrying platform as it is loaded; also to ensure easy running of the load up or off the load-carrying platform.

Referring now to Figure 7, it may be mentioned that the rear end of the boundary plates 25 and 26 is reduced in depth somewhat, and each ramp at each end terminates in the freely-rotatable roller 39 which not only serves to make it easier for the article being loaded to get onto the ramps, but also serves to allow the lower end of the load-carrying platform to ride easily over the ground when traversed backwards in a tipped condition. If a vehicle has all its wheels intact, it will generally suffice merely to draw it up over the rollers onto the ramps, but, on the other hand, if a wheel is smashed and there is an awkward projecting part of the chassis likely to engage a ramp and spoil it, the travelling table 40 will be employed. The table 40 is quite a substantial unit, preferably having a cross lattice or other non-slip body, and at each side the rollers 41 are intended to run on the upstanding portions of the boundary plates 25 and 26. The wheels or rollers 41 may be carried in ball or roller bearings for easy rotation. The end walls 42 of the table are so spaced that the table just fits between the inner surfaces of the plates 25 and 26. Supposing a vehicle has one front wheel missing and it is desired to load it onto the breakdown truck, then the travelling table 40 is placed near the end of the ramp as shown in Figure 7, and one or more additional portable ramps such as 43 and 44 are positioned also as shown. As the load is drawn up, the stub axle or broken part of the chassis rides up over the ramps 43 and 44 onto the travelling table 40. When it is resting upon the travelling table 40, the table continues to move so long as the vehicle is drawn forward and merely serves to prevent any broken part digging into the surface of the ramp as the vehicle is loaded.

In some cases the chain 13 may extend along the sides underneath the load-carrying platform and across one end over pulleys or guides so as to make it compensate and thus avoid side friction on the sides of the guides if unequally adjusted.

It will be appreciated that although it may be preferred to have the ramps formed from wooden battens and flitch plates as hereinbefore described, they may be formed entirely of metal.

What I claim is:

1. In combination a load-carrying platform normally lying in a level position upon a support, said platform being mounted for tipping about a substantially horizontal transverse axis and for movement backward and forward at right-angles thereto so that tipping is effected automatically as the platform is moved beyond a point of balance, whereby said platform may comprise an inclined ramp to facilitate loading and unloading when in its rearmost position; means mounted on the support and permanently connected to said platform for transmitting movement thereto, whereby said platform may be moved through and beyond the point of balance; and additional means for moving said platform forwardly when it is loaded, whereby it will automatically return to a level position.

2. In combination a load-carrying platform mounted on a movable support and normally lying in a level position, said platform being mounted for tipping about a substantially horizontal transverse axis and for movement backward and forward at right-angles thereto so that tipping is effected automatically as the platform in its travel moves beyond a point of balance; means mounted on the support and permanently connected to said platform for transmitting movement thereto, whereby said platform may be moved through and beyond the point of balance; and additional means for moving said platform forwardly when it is loaded, whereby it will automatically return to a level position.

3. In combination a load-carrying platform normally lying in a level position, said platform being mounted for tipping about a fixed horizontal transverse axis and for movement backward and forward at right angles thereto, whereby said platform may comprise an inclined ramp to facilitate loading and unloading when in its rearmost position; means associated with said transverse axis of tipping and said platform for transmitting movement to said platform, whereby it may be moved through and beyond the point of balance; and additional means for moving said platform forwardly when it is loaded, whereby it will automatically return to a level position.

4. In combination a load-carrying platform normally lying in a level position, said platform being mounted for tipping about a fixed horizontal transverse axis and for movement backward and forward at right angles thereto, whereby said platform may comprise an inclined ramp to facilitate loading and unloading when in its rearmost position; means associated with said transverse axis of tipping and said platform for transmitting movement to said platform, whereby said platform may be moved through and beyond the point of balance; means for locking said platform moving means in any desired position, and additional means for moving said platform forwardly when it is loaded, whereby it will automatically return to a level position.

5. A loading and unloading device comprising an elongated support, a shaft on said support and near one end thereof, a loading platform movably mounted upon said support and adapted to be moved over said shaft and extended beyond said support sufficiently to pivot about said shaft to form an inclined ramp to facilitate loading and unloading, means connected to said platform and permanently engaging said shaft for effecting the movement of said platform with respect to the shaft and the support, and means mounted on said support at the opposite end from said shaft for returning said platform, when loaded, to its normal position.

6. In combination a load-carrying platform composed of two laterally-spaced longitudinally-extending and rigidly interconnected ramps mounted as a single structure for tipping about a substantially horizontal transverse axis and for movement backward and forward at right-angles thereto, whereby said platform may comprise an incline to facilitate loading and unloading; boundary plates upstanding at both longitudinal edges of each of said ramps; a table for supporting a load out of engagement with the surface of a ramp; rollers supporting said table and in engagement with the upstanding edges of the boundary plates of one of said ramps, whereby said table may be moved along the ramp and an auxiliary ramp positioned at one edge of said table and adapted to extend downward to the adjacent surface to facilitate the mounting of a load on said table.

7. In combination a load-carrying platform composed of two laterally spaced longitudinally-extending and rigidly interconnected ramps, boundary plates upstanding at both longitudinal edges of each of said ramps, said platform being mounted as a unit for tipping about a substantially horizontal transverse axis and for movement at right angles thereto, and an auxiliary truck provided with rollers arranged to engage the upstanding edges of the boundary plates of one of said ramps, said truck being adapted for placement in operative position or to be removed from said ramp at will, whereby to facilitate the loading of a body incapable of free movement upon said ramp.

8. In combination a load-carrying platform normally lying in a level position upon a support, said platform being mounted for tipping about a substantially horizontal transverse axis and for movement backward and forward at right-angles thereto so that tipping is effected automatically as the platform is moved beyond a point of balance, whereby said platform may comprise an inclined ramp to facilitate loading and unloading when in its rearmost position; rollers positioned on the rear edge of said platform to facilitate the movement of the platform and the loading of an object thereon, means mounted on the support and permanently connected to said platform for transmitting movement thereto, whereby said platform may be moved through and beyond the point of balance; and additional means for moving said platform forwardly when it is loaded, whereby it will automatically return to a level position.

JOHN TELFORD RATCLIFFE.